(12) United States Patent
Honda et al.

(10) Patent No.: US 12,218,563 B2
(45) Date of Patent: Feb. 4, 2025

(54) MOTOR

(71) Applicant: MINEBEA MITSUMI Inc., Nagano (JP)

(72) Inventors: Shotaro Honda, Nagano (JP); Masami Ota, Nagano (JP)

(73) Assignee: MINEBEA MITSUMI Inc., Nagano (JP)

(*) Notice: Subject to any disclaimer, the term of this patent is extended or adjusted under 35 U.S.C. 154(b) by 245 days.

(21) Appl. No.: 18/059,477

(22) Filed: Nov. 29, 2022

(65) Prior Publication Data
US 2023/0188002 A1 Jun. 15, 2023

(30) Foreign Application Priority Data

Dec. 14, 2021 (JP) .................................. 2021-202538
Jan. 31, 2022 (JP) .................................. 2022-013395

(51) Int. Cl.
*H02K 5/22* (2006.01)
*H02K 5/14* (2006.01)
*H02K 11/40* (2016.01)

(52) U.S. Cl.
CPC ............. *H02K 5/225* (2013.01); *H02K 5/145* (2013.01); *H02K 11/40* (2016.01)

(58) Field of Classification Search
CPC ......... H02K 11/40; H02K 5/145; H02K 5/225
USPC ........................................................ 310/71
See application file for complete search history.

(56) References Cited

U.S. PATENT DOCUMENTS

| | | | | |
|---|---|---|---|---|
| 5,343,102 A | * | 8/1994 | Mabuchi ................ | H02K 5/145 |
| | | | | 310/40 MM |
| 6,975,059 B2 | * | 12/2005 | Sakai ..................... | H02K 5/225 |
| | | | | 310/239 |
| 8,519,586 B2 | * | 8/2013 | Terakubo ................ | H02K 5/02 |
| | | | | 310/43 |
| 9,722,470 B2 | * | 8/2017 | Honda .................... | H01R 4/64 |
| 9,899,891 B2 | * | 2/2018 | Sawada .................. | H02K 3/522 |
| 10,270,321 B2 | * | 4/2019 | Tamura .................. | H02K 5/148 |
| 10,411,550 B2 | * | 9/2019 | Hiwa .................. | F04D 25/0613 |
| 10,903,712 B2 | * | 1/2021 | Mao ....................... | H02K 5/225 |
| 10,923,990 B2 | * | 2/2021 | Tanaka ................... | H02K 5/145 |
| 10,985,621 B2 | * | 4/2021 | Yamagata .............. | H02K 21/16 |
| 2003/0067226 A1 | | 4/2003 | Matsushita et al. | |

(Continued)

FOREIGN PATENT DOCUMENTS

JP 2003-116247 A 4/2003

*Primary Examiner* — Alex W Mok
(74) *Attorney, Agent, or Firm* — Chrisman Gallo Tochtrop LLC

(57) ABSTRACT

To provide a motor easily applied with frame ground in a simple configuration and capable of suppressing deformation of a connection terminal in contact with an external terminal connecting to an external device. A motor of the present application includes a metal member of a tubular shape having an opening portion and an inner peripheral surface forming the opening portion in an axial line x direction, a bracket including a tubular part disposed inside the opening portion, and a terminal provided at the bracket. The terminal includes a first portion connected to an external terminal connecting to an external device, and a second portion in contact with the metal member. The second portion is disposed between the inner peripheral surface of the metal member and an outer peripheral surface of the tubular part of the bracket.

8 Claims, 11 Drawing Sheets

(56) References Cited

U.S. PATENT DOCUMENTS

| | | | |
|---|---|---|---|
| 2016/0285340 A1* | 9/2016 | Hiwa | F04D 29/083 |
| 2021/0028669 A1* | 1/2021 | Ota | H02K 11/026 |
| 2021/0288548 A1* | 9/2021 | Ohba | H02K 11/30 |

* cited by examiner

MOTOR

CROSS-REFERENCE TO RELATED APPLICATIONS

This application claims benefit of Japanese Application Nos. 2021-202538 filed on Dec. 14, 2021 and 2022-013395 filed on Jan. 31, 2022, the entire contents of which are incorporated herein by reference.

TECHNICAL FIELD

The present invention relates to a motor.

BACKGROUND ART

Conventionally, a motor including a connection terminal in contact with an external terminal connected to an external device and a bracket housing the connection terminal, and configured to drive by the external terminal being connected to the connection terminal has been known (For example, see Patent Literature 1).

In the motor as described above, as a measure to suppress electric noise generated when the motor is driven, prevent erroneous operations, and the like, connecting a frame to the ground (so-called "frame ground") is carried out in some cases. When the frame ground is carried out, the grounding is achieved by directly connecting to a wiring line of a substrate inside the motor, or electrically connecting to an inner surface of the frame via a jumper line. However, in addition to the wiring work being complicated, there arises a risk of disconnection over time due to vibrations of the motor, because the substrate, the jumper line, and the inner surface of the frame are connected to each other by soldering.

Meanwhile, such an operation is repeated that the external terminal connected to the external device is inserted into the connection terminal from the outside to be in contact with and connected to the connection terminal. At this time, a large force is applied to the connection terminal, and there is a concern that the connection terminal is deformed when an excessive force repeatedly acts on the connection terminal.

CITATION LIST

Patent Literature

Patent Literature 1: JP 2003-116247 A

SUMMARY OF INVENTION

Technical Problem

An example of an object of the present invention is to provide a motor easily applied with frame ground in a simple configuration and capable of suppressing deformation of a connection terminal in contact with an external terminal connected to an external device.

Solution to Problem

The above-mentioned problem is solved by one aspect of the present invention described below, for example. That is, one aspect of a motor of the present invention includes, a metal member including a tubular shape having an opening portion and an inner peripheral surface forming the opening portion in an axial direction, a bracket including a tubular part disposed inside the opening portion, and a terminal provided at the bracket, wherein the terminal includes a first portion connected to an external terminal connecting to an external device, and a second portion in contact with the metal member, and the second portion is disposed between the inner peripheral surface of the metal member and an outer peripheral surface of the tubular part of the bracket.

BRIEF DESCRIPTION OF DRAWINGS

FIG. 12 is a side view seen from one side c of a bracket attached with components and the like.

DESCRIPTION OF EMBODIMENTS

A motor according to embodiments of the present invention will be described below with reference to the drawings.

Figure 1:
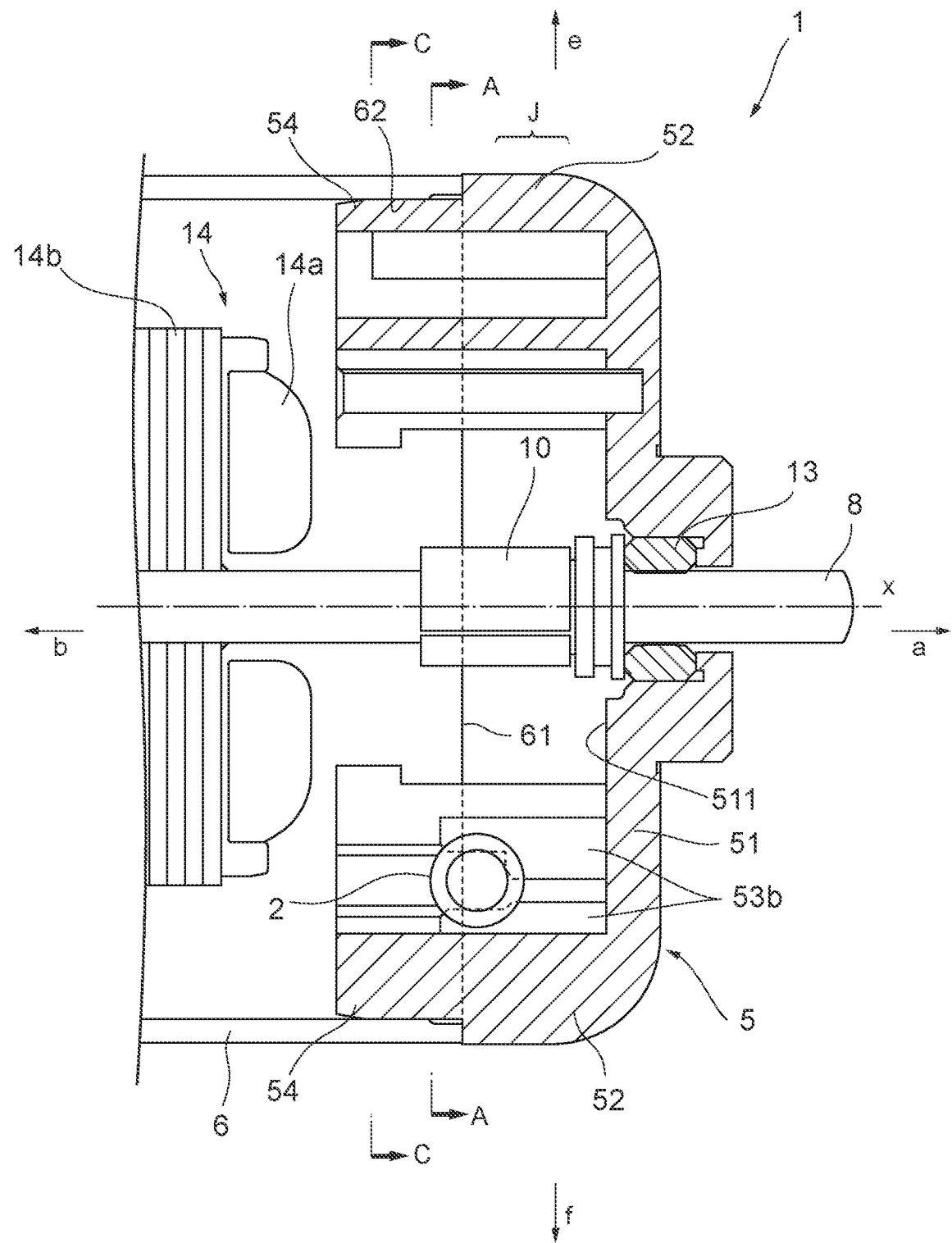
FIG. 1 is a vertical cross-sectional view illustrating the vicinity of a bracket of a motor according to an embodiment as an example of the present invention, and corresponds to a B-B cross-sectional view in FIG. 2.
Figure 2:
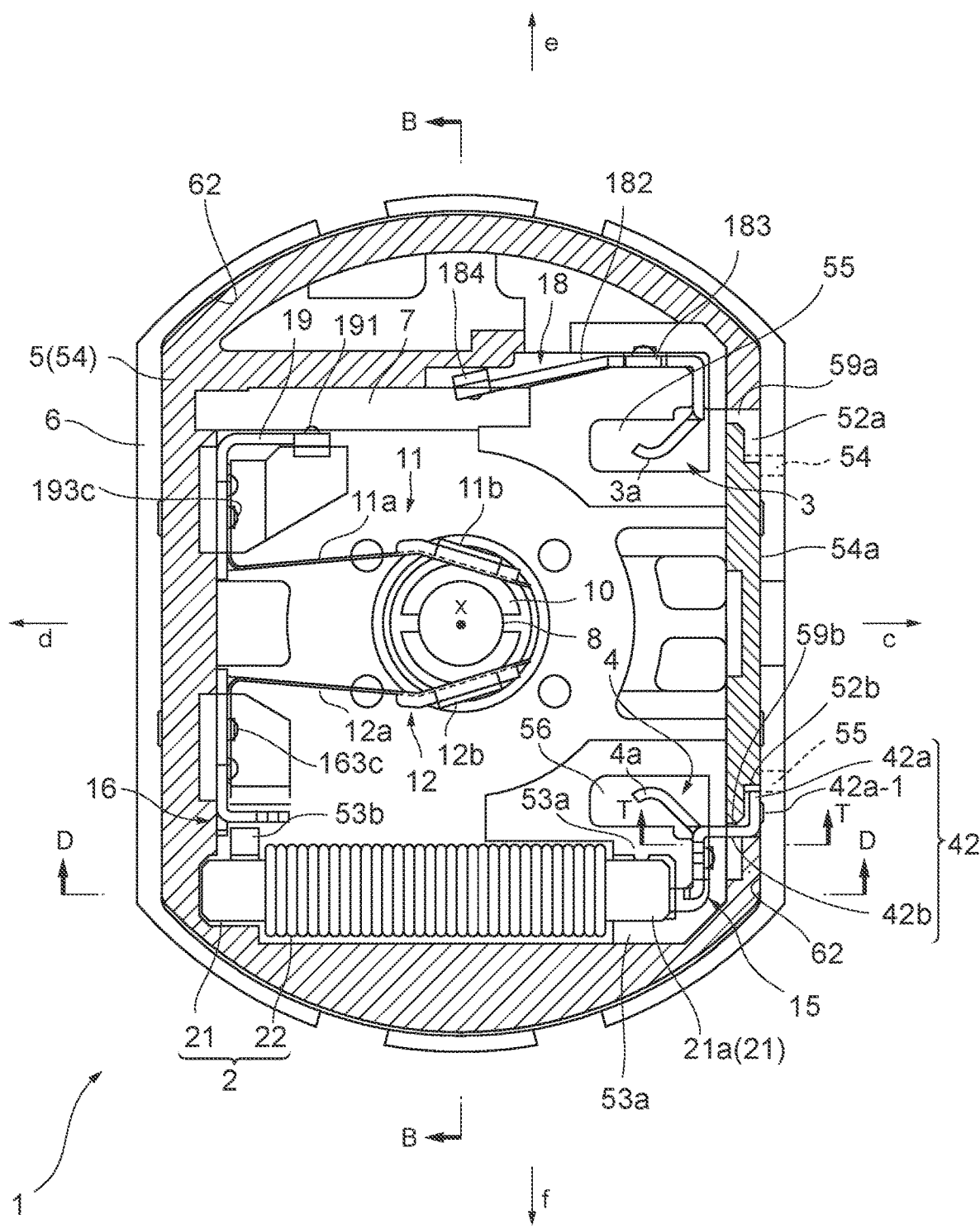
FIG. 2 is a transverse cross-sectional view at a position of a bracket of a motor according to an embodiment as an example of the present invention, and corresponds to an A-A cross-sectional view in FIG. 1.
Figure 3:
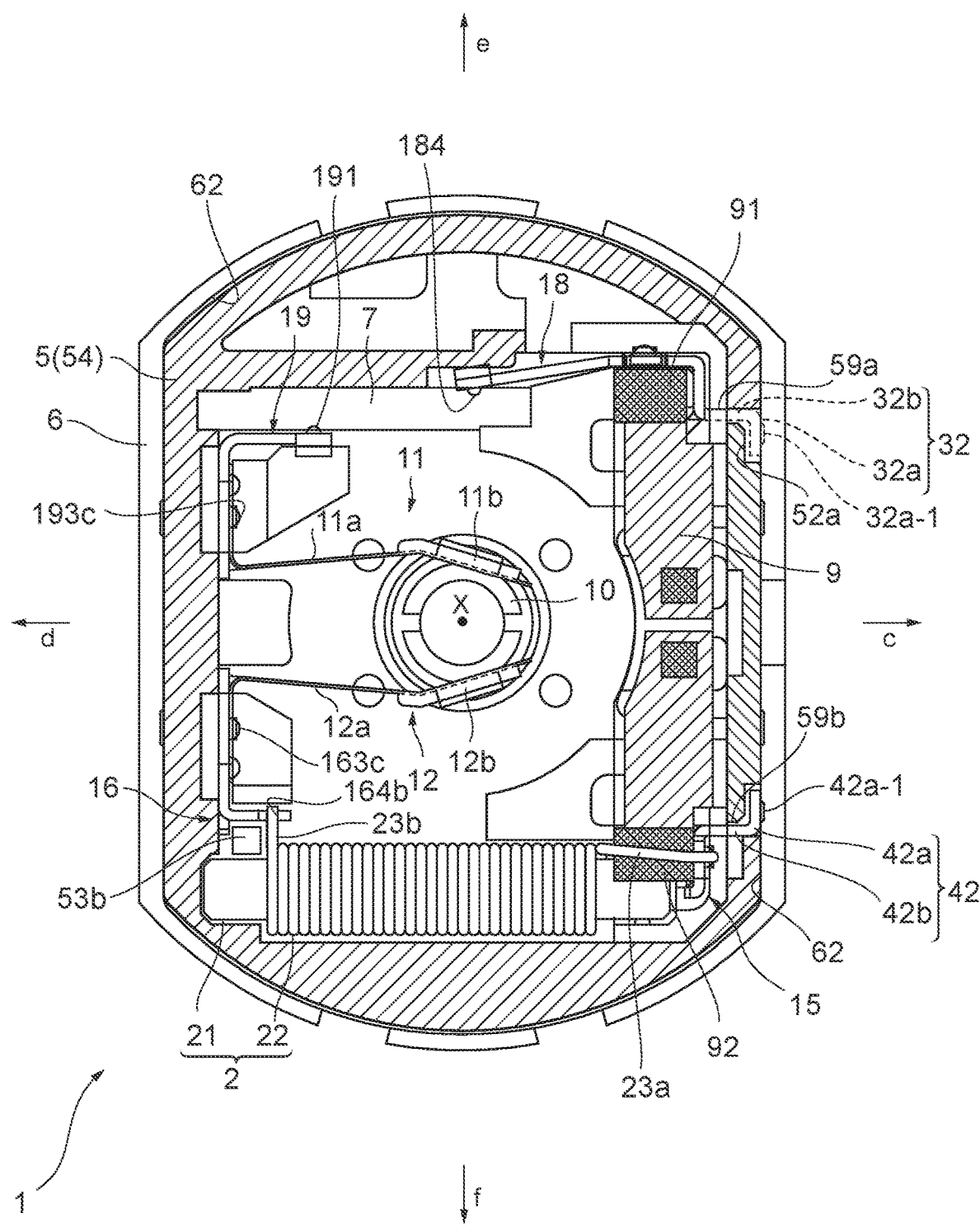
FIG. 3 is a transverse cross-sectional view at a position of a bracket of a motor according to an embodiment as an example of the present invention, and corresponds to a C-C cross-sectional view in FIG. 1.

FIG. 1 is a vertical cross-sectional view illustrating the vicinity of a bracket 5 of a motor 1 according to an embodiment as an example of the present invention, FIG. 2 is a transverse cross-sectional view at a position of the bracket 5 of the motor 1, and FIG. 3 is a transverse cross-sectional view at a position different from the position in FIG. 2 of the bracket 5 of the motor 1. FIG. 1 corresponds to a B-B cross-sectional view in FIG. 2, FIG. 2 corresponds to an A-A cross-sectional view in FIG. 1, and FIG. 3 corresponds to a C-C cross-sectional view in FIG. 1.

Some members such as support members (brushes) 11 and 12 described below are omitted in FIG. 1.

Figure 4:
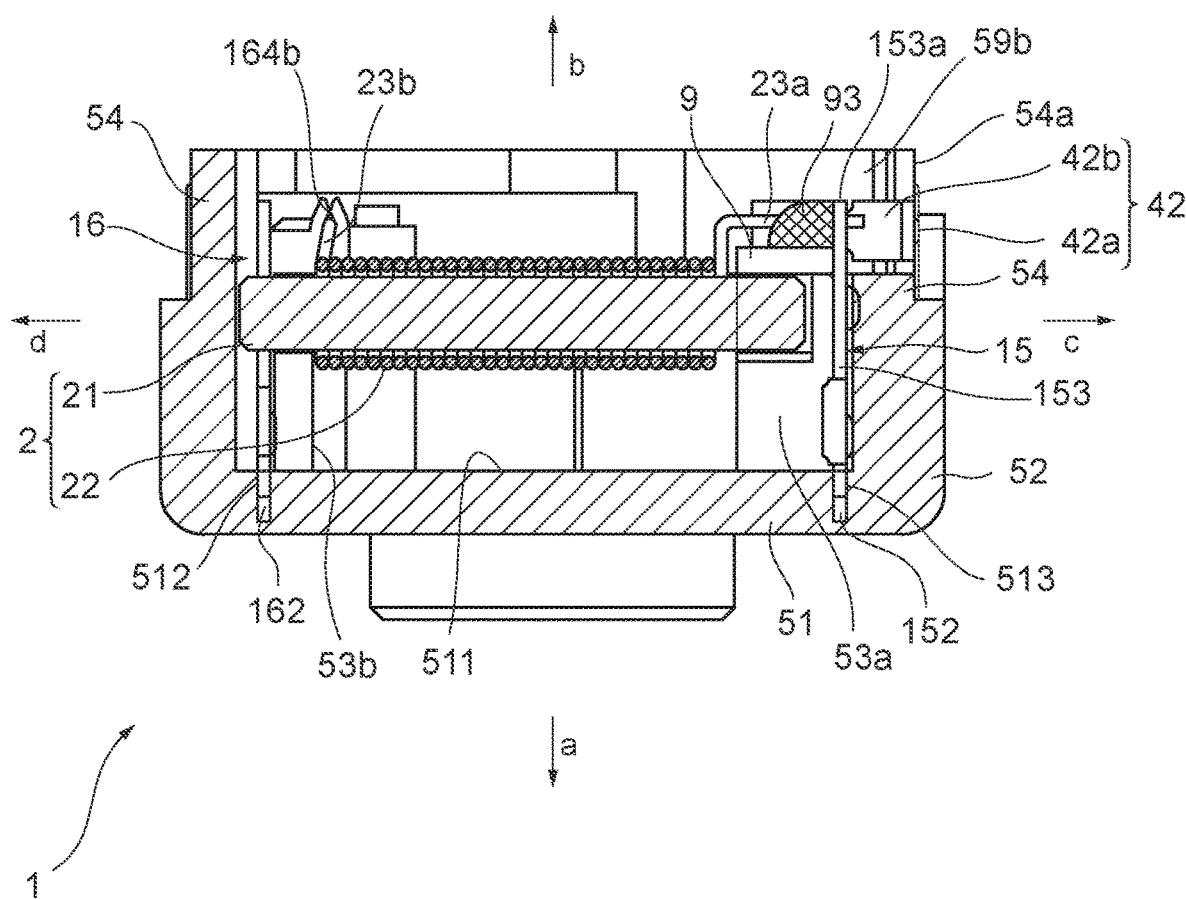
FIG. 4 is a D-D cross-sectional view in FIG. 2 illustrating the vicinity of a bracket of a motor according to an embodiment as an example of the present invention.

FIG. 4 is a D-D cross-sectional view in FIG. 2 illustrating the vicinity of the bracket 5 of the motor 1. In FIG. 4, an upper side a faces downward, and a lower side b faces upward.

As illustrated in FIGS. 1 to 4, the motor 1 of the present embodiment includes a choke coil 2, connection terminals 3 and 4 (hereinafter, the connection terminal 3 and the connection terminal 4 are referred to as a "first connection terminal 3" and a "second connection terminal 4" respectively) including contact surfaces 3a and 4a in contact (connected) with an external terminal connecting to an external device, a substrate 9 including a wiring line electrically connecting the choke coil 2 and the connection terminals 3 and 4, the bracket 5 provided with the choke coil 2, the connection terminals 3 and 4, and the substrate 9, and a frame 6 fitting with the bracket 5.

In the following description of the present embodiment, in an axial line X direction of the motor 1, an arrow a direction is referred to as the upper side a, and an arrow b direction is referred to as the lower side b. Among the directions perpendicular to the axial line x, in a longitudinal direction of the choke coil 2 (an arrow c direction and an arrow d direction, hereinafter, also referred to as a "longitudinal direction cd"), the arrow c direction is defined as one side c in the longitudinal direction, and the arrow d direction is defined as the other side d in the longitudinal direction. Furthermore, in a direction perpendicular to both the axial line x direction and the longitudinal direction cd (an arrow e direction and an arrow f direction, hereinafter, also referred to as a "perpendicular direction ef"), the arrow e direction is defined as one side e in the perpendicular direction, and the arrow f direction is defined as the other side f in the perpendicular direction. The longitudinal direction of the choke coil 2 is also an axial direction of the choke coil, and the perpendicular direction of the choke coil 2 is also a radial direction of the choke coil 2.

The motor 1 includes a shaft 8 extending in the axial line x direction. The shaft 8 is rotatably attached to the bracket 5 at the upper side a via a bearing 13 in the axial line x direction, and an end part at the upper side a protrudes toward the upper side a of the bracket 5. Although not illustrated, an end part at the lower side b of the shaft 8 is rotatably attached to the frame 6 via a bearing in the axial line x direction.

A commutator 10 is attached to the shaft 8 at the lower side b of the bearing 13 in the axial line x direction on the same axis as the axis of the shaft 8. A rotor 14 is attached to the shaft 8 at the lower side b of the commutator 10 in the axial line x direction on the same axis as the axis of the shaft 8.

The rotor 14 includes a plurality of rotor cores 14b extending radially outward in the radial direction from the shaft 8, and a coil 14a wound around the rotor core 14b.

The frame 6 is a tubular metal member, and includes an opening portion 61 at the upper side a and an inner peripheral surface 62 forming the opening portion 61. The bracket 5 has a tray-like shape located at the upper side a in the motor 1 and covering the opening portion 61 of the frame 6. That is, the bracket 5 includes a lid 51 at the upper side a, a side part 52 formed in a tubular shape rising from the outer periphery of the lid 51 in the lower side b direction, and a tubular part 54 extending from the side part 52 toward the lower side b and having a smaller outer shape than an outer shape of the side part 52. As illustrated in FIGS. 1 to 3, the tubular part 54 of the bracket 5 is disposed in the opening portion 61 at the end part at the upper side a of the frame 6, and is fitted in the opening portion 61 and fixed to the inner peripheral surface 62 of the frame 6.

The commutator 10 is a component constituted of a plurality of metal plates (also referred to as "segments") aligned and attached in a circumferential direction, when contact parts 11b and 12b of the support members 11 and 12 described below make contact with the surfaces of the plurality of metal plates, a DC current for making the rotor 14 generate a rotational force is supplied to the coil 14a while the current direction is being switched appropriately.

A pair of conductive members (referred to as "support members") 11 and 12 functioning as so-called brushes includes a pair of supporting parts 11a and 12a and a pair of the contact parts 11b and 12b respectively. The pair of supporting parts 11a and 12a support the pair of contact parts 11b and 12b with respect to the bracket 5. The pair of contact parts 11b and 12b are in contact with the plurality of metal plates of the commutator 10, and the commutator 10 is disposed between the pair of contact parts 11b and 12b. The support member 11 and the support member 12 have a line-symmetrical shape based on a straight line parallel with the longitudinal direction cd of the choke coil 2.

The motor 1 includes a positive temperature coefficient (PTC) thermistor 7 with a positive temperature coefficient, coupling terminals 18 and 19 (hereinafter, the coupling terminal 18 and the coupling terminal 9 are referred to as a "first coupling terminal 18" and a "second coupling terminal 19" respectively) connected to the PTC thermistor 7, terminal members 15 and 16 (hereinafter, the terminal member 15 and the terminal member 16 are referred to as a "first terminal member 15" and a "second terminal member 16" respectively) connected to the choke coil 2, and the commutator 10 electrically connected to the second terminal member 16 and the second coupling terminal 19.

The choke coil 2 is provided at the arrow f side in the bracket 5, and includes one end on the connection terminals (the first connection terminal 3 and second connection terminal 4) side (one side c), and the other end at the opposite side (the other side d) to the connection terminals side.

The choke coil 2 includes a coil 22 and a yoke (iron core) 21 surrounded by the coil 22. The coil 22 is wound around an outer peripheral surface of the yoke 21.

From the choke coil 2, a draw wire (hereinafter, referred to as a "first draw wire") 23a is drawn from the coil 22 toward the one side c in the longitudinal direction and electrically connected to an external device (not illustrated), and a draw wire (hereinafter, referred to as a "second draw wire") 23b is drawn from the coil 22 toward the other side d in the longitudinal direction and electrically connected to the commutator 10.

Figure 5:
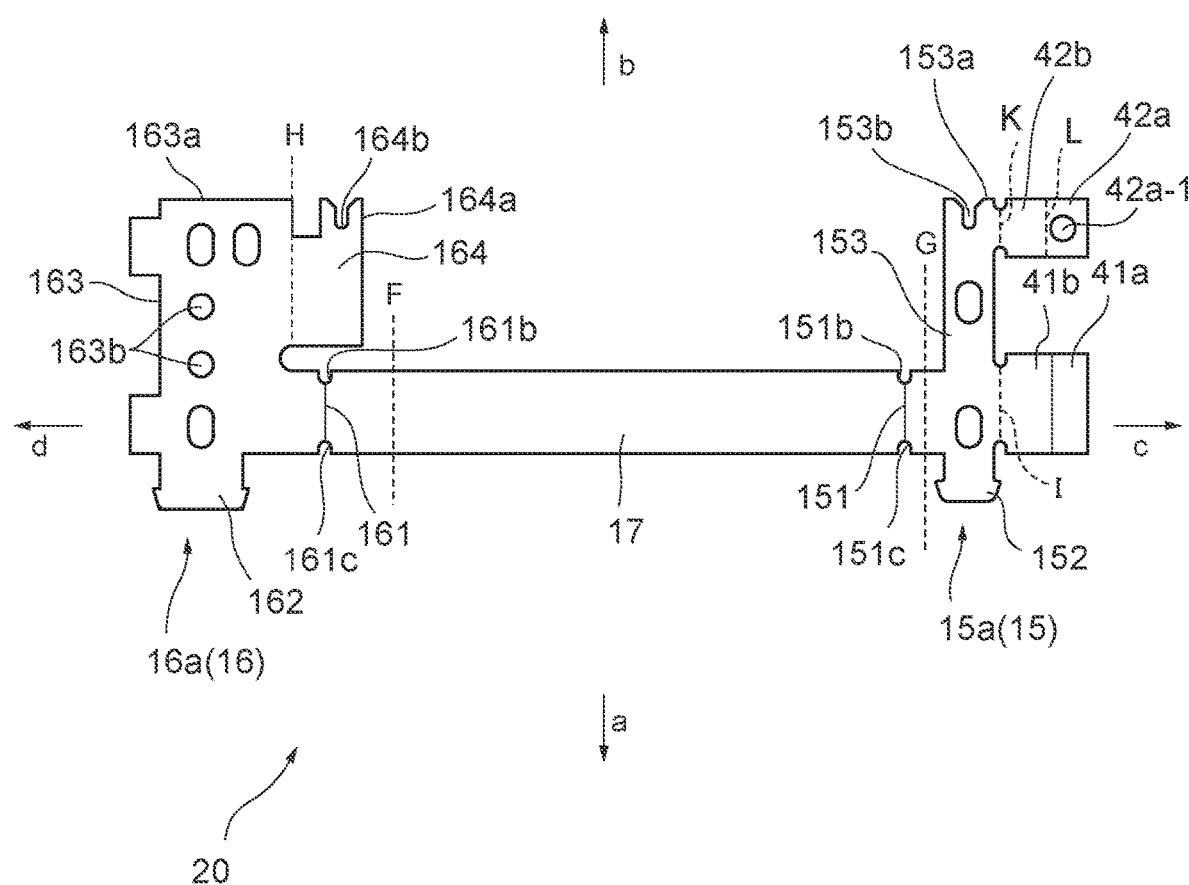
FIG. 5 is a front view of a first intermediate member including a portion forming a first terminal member and a second terminal member.

A member (intermediate member) punched out from a sheet of metal plate is molded into a predetermined shape and is further subjected to cutting, so as to fabricate the first terminal member 15 and the second terminal member 16. FIG. 5 illustrates a front view of an intermediate member (hereinafter, referred to as a "first intermediate member") 20 including portions 15a and 16a forming the first terminal member 15 and the second terminal member 16. In FIG. 5, the upper side a faces downward, and the lower side b faces upward.

The first intermediate member 20 includes the portion 15a forming the first terminal member 15, the portion 16a forming the second terminal member 16, and a coupling part 17 coupling the portions 15a and 16a. As described later, the portion 15a forming the first terminal member 15 includes portions 41b and 41a forming the second connection terminal 4, and portions 42b and 42a forming a frame ground part 42.

The portion 15a forming the first terminal member 15 includes a protruding part (hereinafter, referred to as a "leg part") 152 at the upper side a, and a protruding part 153 at the lower side b. The leg part 152 has a hook shape, and is inserted into and engaged with (fixed to) a recess part (insertion hole) 513 provided at a top surface 511 of the bracket 5.

At the upper side a of the protruding part 153, the portion 41b and portion 41a forming the second connection terminal 4 are continued in that order toward the side (the arrow c direction side) opposite to the side continued with the coupling part 17. As described below, of the portions forming the second connection terminal 4, the portion 41a (the portion forming the contact surface 4a) is a first portion connected to the external terminal connecting to the external device. Thus, the second connection terminal 4 may be referred to as the second connection terminal (first portion) 4.

At the lower side b of the protruding part 153, the portion 42b and the portion 42a forming the frame ground part 42 are continued in that order toward the side (the arrow c direction side) opposite to the side continued with the coupling part 17. As described below, the portion 42a forming the frame ground part 42 is a second portion in contact with the inner peripheral surface 62 of the frame 6 as the metal member. Thus, the frame ground part 42 may be referred to as the frame ground part (second portion) 42.

Recesses 151b and 151c are provided at both sides in a width direction between the coupling part 17 and the portion 15a. Recesses 161b and 161c are provided at both the sides in the width direction between the coupling part 17 and the portion 16a. By taking the recess 151b and the recess 151c as a cutting guide, and making a line connecting the two recesses be a separating line 151, the coupling part 17 and the portion 15a are configured to be cut and separated from each other. Likewise, by taking the recess 161b and the recess 161c as a cutting guide, and making a line connecting the two recesses be a separating line 161, the coupling part 17 and the portion 16a are configured to be cut and separated from each other.

The first intermediate member 20 is folded at the positions of folding lines F and G to form mountain folds with respect to the surface of the drawing of FIG. 5, and to form a substantially right angle with respect to the surface of the coupling part 17. The first intermediate member 20 is also folded at the position of a folding line H to form a mountain fold with respect to the surface of the drawing of FIG. 5, and to be substantially parallel to the surface of the coupling part 17. In this manner, the portion 15a and the portion 16a are formed in the shapes of the first terminal member 15 and the second terminal member 16, respectively.

The first intermediate member 20 is folded at the position of a folding line I in such a manner that a mountain fold is made with respect to the surface of the drawing of FIG. 5, and an angle formed between the surface of the portion 15a and the surface of the portion 41b is a narrow angle (see FIG. 6 described below, approximately 45 degrees in FIG. 6). Then, a region of the portion 41a is rounded with a predetermined curvature toward the same side as in a folding direction at the folding line I (the mountain fold side with respect to the surface of the drawing of FIG. 5) while taking a boundary line between the portion 41a and the portion 41b as a start point. In this manner, the portions 41a and 41b are formed in the shape of the second connection terminal 4.

The first intermediate member 20 is also folded at the position of a folding line K to form a valley fold with respect to the surface of the drawing of FIG. 5, and to be substantially parallel to the surface of the coupling part 17. The first intermediate member 20 is also folded at the position of a folding line L to form a mountain fold with respect to the surface of the drawing of FIG. 5, and to be substantially perpendicular to the surface of the coupling part 17. In this manner, the portions 42a and 42b are formed in the shape of the frame ground part 42.

In the first intermediate member 20 having the shapes of the first terminal member 15 and the second terminal member 16, the supporting part 12a of the support member 12 is attached to the portion 16a. A top view (a view seen from the upper side a) representing a component 24 is illustrated in FIG. 6, and a front view (a view seen from the other side f) is illustrated in FIG. 7. In the component 24, the support member 12 is attached to the first intermediate member 20. In FIG. 6, the positions of the folding lines F to I and the folding lines K to L are respectively illustrated. At the folding lines F to I and the folding lines K to L, the first intermediate member 20 is folded by folding processing.

The first intermediate member 20 after folding processing includes the portion 15a forming the first terminal member 15 and the portion 16a forming the second terminal member 16, as described earlier. The portion 15a forming the first terminal member 15 includes the portions 41a and 41b forming the second connection terminal 4, and the portions 42a and 42b forming the frame ground part 42.

By cutting at the separating lines 151 and 161 and removing the coupling part 17, the first terminal member 15 (including the second connection terminal 4 and the frame ground part 42) and second terminal member 16 are obtained. In the following description, regardless of presence or absence of the coupling part 17, the respective elements are called by the names of the corresponding completed components (the first terminal member 15, the second terminal member 16, the second connection terminal 4, and the frame ground part 42).

When it is attempted to achieve a motor equipped without the choke coil 2 in a similar configuration to the configuration of the motor 1 of the present embodiment, it is sufficient to use the intermediate member 20 after folding processing in the shape as it is without removing the coupling part 17. By doing so, the portion having incorporated the choke coil 2 once is made to be in a directly-coupled state, so that an electric circuit is established to make it possible to function as the motor equipped without the choke coil (see a motor 1' of a modification example illustrated in FIGS. 13 and 14).

The second terminal member 16 includes a leg part 162, an attachment part 163, and a projecting part 164. The leg part 162 is an engagement part to engage with the bracket 5 at the upper side a. The supporting part 12a is attached to the attachment part 163 at the lower side b. The projecting part 164 is continued at the lower side b from the attachment part 163 toward the other side f, and is folded toward the one side c to project from the attachment part 163. The leg part 162 has a hook shape, and is inserted into and engaged with (fixed to) an insertion hole 512 having a slit shape and provided at the surface opposing the lower side b (hereinafter, called "top surface 511") in the lid 51 of the bracket 5.

In the axial line x direction, the attachment part 163 is continued at the lower side b of the leg part 162, and two holes 163b for attaching the supporting part 12a are provided in the axial line x direction in the vicinity of a central part (intermediate part) between an end part 163a at the lower side b of the attachment part 163 and the leg part 162. The support member 12 is attached to the second terminal member 16 by a fixture 163c such as a screw so that an attached surface 12a' of the supporting part 12a of the support member 12 makes contact with a surface 163d opposing the one side c of the attachment part 163 (see FIGS. 6 and 7).

The second terminal member 16 includes a protruding part 164a protruding toward the lower side b closer to the end part at the one side c of the projecting part 164, and an engagement part 164b having a slit opening toward the lower side b is formed at an end part at the lower side b of the protruding part 164a.

In the first terminal member 15, an engagement part 153b having a slit opening toward the lower side b is formed at an end part 153a at the lower side b of the protruding part 153.

Figure 6:
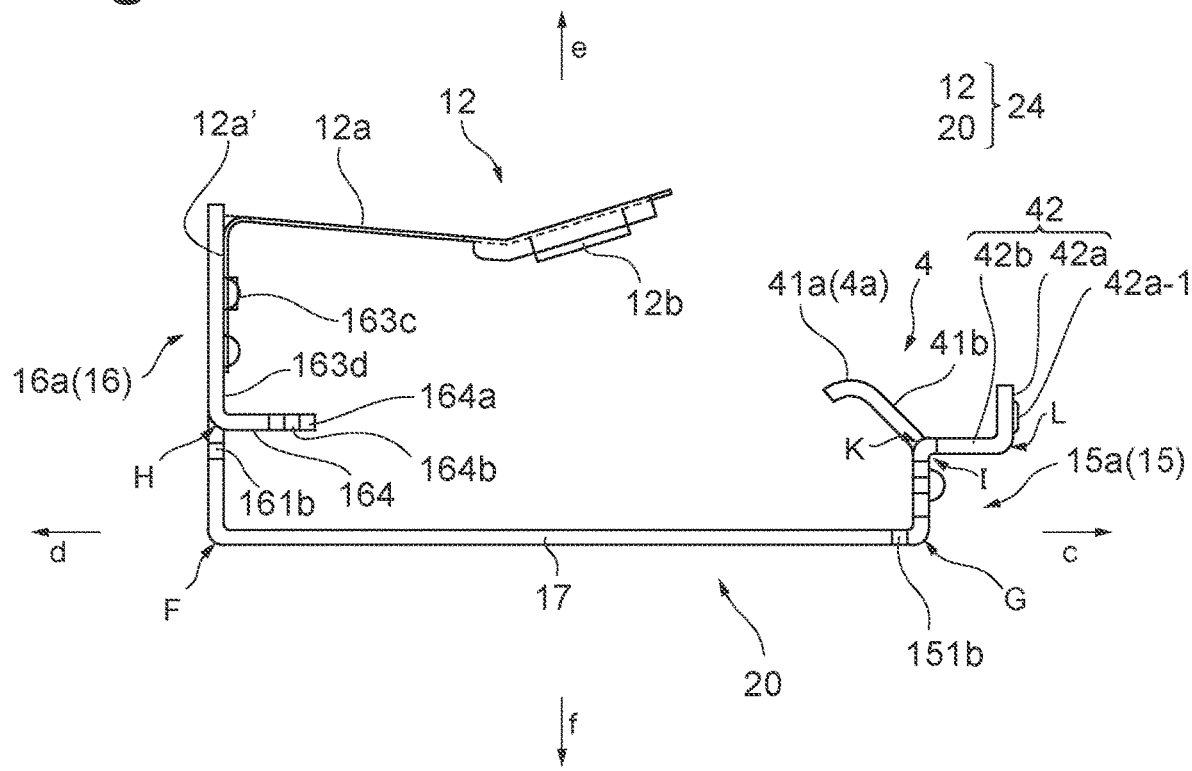
FIG. 6 is a top view (a view seen from an upper side a) illustrating a state where a supporting part of a support member is attached to the first intermediate member including the portion forming the first terminal member and the second terminal member.
Figure 7:
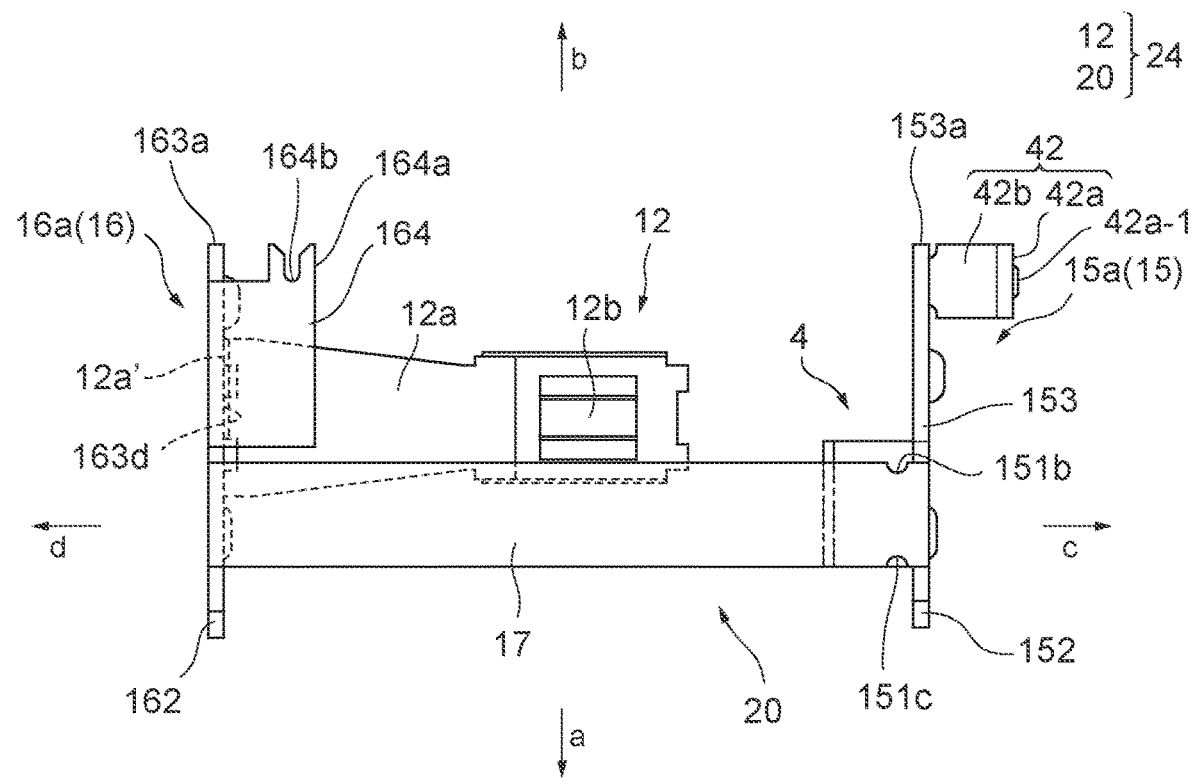
FIG. 7 is a front view (a view seen from "the other side f") illustrating the state where the supporting part of the support member is attached to the first intermediate member including the portion forming the first terminal member and the second terminal member.

As described above, the component 24 with the support member 12 attached to the first intermediate member 20 as illustrated in FIGS. 6 and 7 is obtained.

The component 24 is attached to the bracket 5 in a state of the component 24 as it is, or in a state of two pieces of components of a component including the first terminal member 15 and the second connection terminal 4, and a component including the second terminal member 16 and the support member 12, the two pieces of components are achieved by the operation of cutting at the separating lines 151 and 161 and then removing the coupling part 17. When attached to the bracket 5 in the state of the component 24 as it is, after the attachment, cutting may be performed at the separating lines 151 and 161 and the coupling part 17 may be removed.

As illustrated in FIG. 4, since the leg part 152 is inserted into and engaged with (fixed to) the insertion hole 513 provided at the top surface 511 of the bracket 5, the first terminal member 15 is attached to the bracket 5. Meanwhile, since the leg part 162 is inserted into and engaged with (fixed to) the insertion hole 512 provided at the top surface 511 of the bracket 5, the second terminal member 16 is attached to the bracket 5.

The top surface 511 of the bracket 5 is provided with a plurality (two in the present embodiment) of holding parts 53a and 53b, and the choke coil 2 is held by the holding parts 53a and 53b (see FIGS. 2 and 4). The holding parts 53a and 53b are disposed in pair in the longitudinal direction cd of the choke coil 2, and the yoke 21 protruding from both ends of the coil 22 of the choke coil 2 is held by the holding parts 53a and 53b.

Although the number of pieces of the holding parts 53a and 53b is two in the present embodiment, another holding part for holding the outer peripheral surface of the coil 22 may be provided, holding parts for holding the outer peripheral surface of the coil 22 may be provided in place of the holding parts for holding the yoke 21 at both the ends, or the holding parts 53a and 53b and another holding part may be combined. Any number of holding parts is possible, but the plurality of holding parts is preferably provided in order to stably hold the choke coil 2. In order to hold the choke coil, the holding parts are preferably provided at the top surface 511 of the bracket 5, but some of the holding parts or all of the holding parts as long as the choke coil can be stably held, may be provided, for example, at a location other than the top surface 511 such as the side part 52.

In the present embodiment, the terminal including the second connection terminal 4 corresponding to the first portion and the frame ground part 42 corresponding to the second portion corresponds to the first terminal member 15.

The first terminal member 15 branches into the second connection terminal (first portion) 4 and the frame ground part (second portion) 42 at the protruding part 153 (another portion of the terminal).

The second connection terminal (first portion) 4 includes, as illustrated in FIGS. 2 and 6, the contact surface 4a extending from the protruding part 153 at the position of the folding line I toward the shaft 8, and having a predetermined curved surface at the tip part. The second connection terminal (first portion) 4 is located in a space 56 provided in the bracket 5, as illustrated in FIG. 2.

The frame ground part (second portion) 42 extends at the position of the folding line K from the protruding part 153 toward the inner peripheral surface 62 of the frame (metal member) 6, as illustrated in FIGS. 2 and 6. The positions of the folding line K and the folding line I are set in such a manner that only the folding directions are different, but the positions of the folding axes extending in the axial line x direction are substantially coincident with each other.

Further, the frame ground part (second portion) 42 is folded in the arrow e direction at the position of the folding line L, and continues to the portion 42a extending in a direction along the inner peripheral surface 62 of the frame 6, as illustrated in FIGS. 2 and 6. As illustrated in FIG. 6, the frame ground part 42 includes a projection part 42a-1 having a circular emboss shape substantially at the center of a surface opposing the inner peripheral surface 62 of the frame 6 in the portion 42a.

In the motor 1, based on a straight line passing through the core (axial line x) of the shaft 8 in the arrow cd direction, the first connection terminal 3, the first coupling terminal 18, and the second coupling terminal 19 are arranged at the positions approximately symmetric to the positions of the second connection terminal 4, the first terminal member 15, and the second terminal member 16. A member (intermediate member) punched out from a sheet of metal plate is molded and is further subjected to cutting, so as to fabricate the first connection terminal 3, the first coupling terminal 18, and the second coupling terminal 19 as well.

Figure 8:
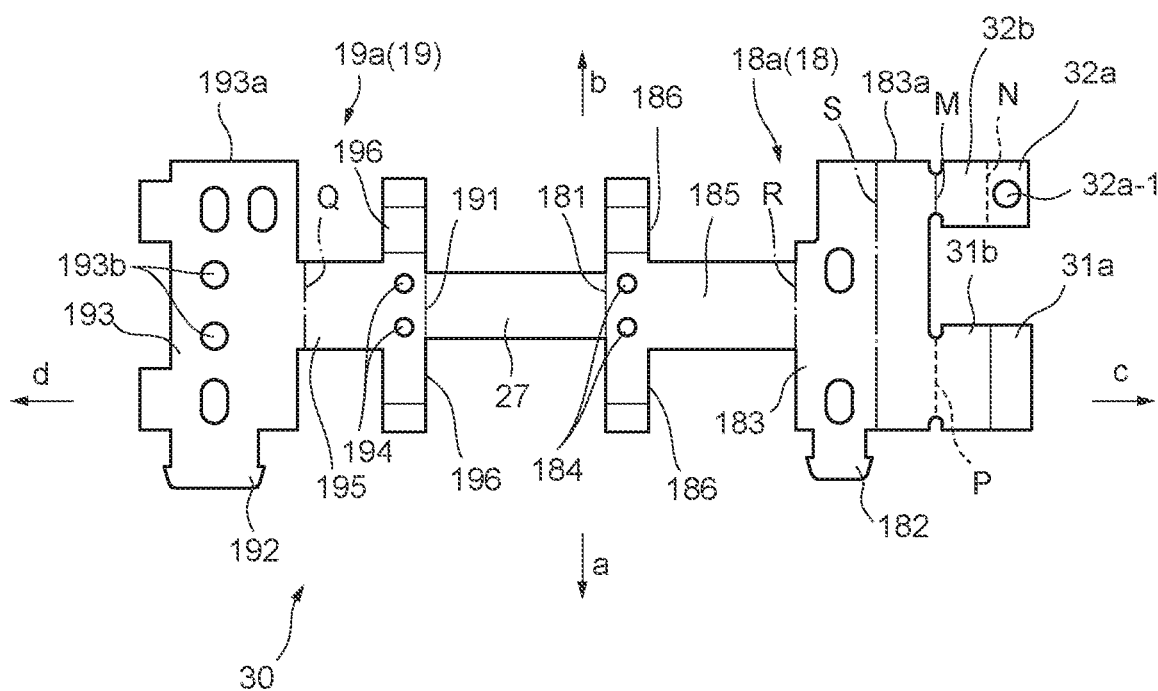
FIG. 8 is a front view of a second intermediate member including a portion forming a first connection terminal, a first coupling terminal, and a second coupling terminal.

FIG. 8 illustrates a front view of an intermediate member (hereinafter, referred to as a "second intermediate member") 30 including portions 31a, 31b, 18a, and 19a forming the first connection terminal 3, the first coupling terminal 18, and the second coupling terminal 19. In FIG. 8, the upper side a faces downward, and the lower side b faces upward.

The second intermediate member 30 includes the portions 31b and 31a forming the first connection terminal 3, the portion 18a forming the first coupling terminal 18, the portion 19a forming the second coupling terminal 19, and a coupling part 27 for coupling the portions 18a and 19a. The portion 18a forming the first coupling terminal 18 includes portions 32b and 32a capable of forming a frame ground part. However, in the present embodiment, the portion 32b is not used as a frame ground part, as described below. In FIG. 3, a frame ground part 32 depicted with dotted lines is not present in the present embodiment.

A leg part 182 is provided at the upper side a and a main part 183 is provided at the lower side b at the arrow c side of the portion 18a forming the first coupling terminal 18. A contact part 184 and a plate spring part 186 extending in the up-down ab direction from the contact part 184 are provided at the arrow d side of the portion 18a. At the center in the arrow cd direction of the portion 18a, there is provided a conductive part 185 electrically connecting the main part 183 and the contact part 184.

The leg part 182 has a hook shape, and is inserted into and engaged with (fixed to) an insertion hole (not illustrated) provided at the top surface 511 of the bracket 5.

At the upper side a of the main part 183, the portion 31b and the portion 31a forming the first connection terminal 3 are continued in that order toward the side (the arrow c direction side) opposite to the side continued with the coupling part 27. As described below, of the portions forming the first connection terminal 3, the portion 31a is the first portion connected to the external terminal connecting to the external device. Thus, the first connection terminal 3 may be referred to as the first connection terminal (first portion) 3.

At the up side b of the main part 183, the portion 32b and portion 32a capable of forming the frame ground part are continued in that order toward the side (the arrow c direction side) opposite to the side continued with the coupling part 27. An example of using the portion 32b and the portion 32a as the frame ground part will be described after the description of the present embodiment.

The contact part 184 is provided near an end part at the arrow d side of the conductive part 185. The contact part 184 is formed of two circular emboss-shaped projection parts, and projects toward the front side of the paper surface of FIG. 8. A separating line 181 between the coupling part 27 and the portion 18a is provided at the arrow d side of the contact part 184.

At the separating line 181, the coupling part 27 and the portion 18a are configured to be cut and separated from each other. Likewise, at a separating line 191 between the portion 19a forming the second coupling terminal 19 and the coupling part 27, the coupling part 27 and the portion 19a are configured to be cut and separated from each other. The separating lines 181 and 191 may be provided with cutting guides for facilitating the cut and separation (for example, recesses having a shape like the recesses 151b and 151c are provided to thin the plate thickness along the separating lines 181 and 191).

A contact part 194 is provided at the arrow d side close to the separating line 191, and a plate spring part 196 extending in the up-down ab direction from the contact part 194 is provided. The contact part 194 is formed of two circular emboss-shaped projection parts, and projects toward the deep side of the paper surface of FIG. 8 (in other words, a recess part is formed at the front side of the paper surface).

At the arrow d side of the portion 19a forming the second coupling terminal 19, a leg part 192 and an attachment part 193 are provided at the upper side a and the lower side b, respectively. The leg part 192 has a hook shape, and is inserted into and engaged with (fixed to) an insertion hole (not illustrated) provided at the top surface 511 of the bracket 5. At the center slightly closer to the arrow c side in the arrow cd direction of the portion 19a, there is provided a conductive part 195 electrically connecting the attachment part 193 and the contact part 194.

The second intermediate member 30 is folded at the position of a folding lines Q to form a valley fold with respect to the surface of the drawing of FIG. 8, and to form a slightly obtuse angle with respect to the surface of the coupling part 27. The second intermediate member 30 is slightly folded at the position of a folding line R to form the valley fold with respect to the surface of the drawing of FIG. 8. The second intermediate member 30 is also folded at the position of a folding line S to form the valley fold with respect to the surface of the drawing of FIG. 8, and to be perpendicular to the surface at the arrow c side of the main part 183. In this manner, the portions 18a and 19a are formed in the shapes of the first and second coupling terminals 18 and 19, respectively.

The second intermediate member 30 is folded at the position of a folding line P in such a manner that the valley fold is made with respect to the surface of the drawing of FIG. 8, and an angle formed between the surface of the portion 18a and the surface of the portion 31b is a narrow angle (see FIG. 9 described below, approximately 45 degrees in FIG. 9). Then, a region of the portion 31a is rounded with a predetermined curvature toward the same side as the folding direction at the folding line P (a mountain fold side with respect to the surface of the drawing of FIG. 8) while taking a boundary line between the portion 31a and the portion 31b as a start point. In this manner, the portions 31a and 31b are formed in the shape of the first connection terminal 3. As is understood from FIG. 2, the first connection terminal 3 has a line-symmetrical shape with the second connection terminal 4 based on a straight line parallel with the longitudinal direction cd of the choke coil 2.

The second intermediate member 30 is also folded at the position of a folding line M to form the mountain fold with respect to the surface of the drawing of FIG. 8, and to be substantially parallel to the surface at the arrow d side of the main part 183. Further, the second intermediate member 30 is folded at the position of a folding line N to form the valley fold with respect to the surface of the drawing of FIG. 8, and to be substantially perpendicular to the surface at the arrow d side of the main part 183. In this manner, the portions 32a and 32b are formed in the shape of the frame ground part 32.

In the second intermediate member 30 having the shapes of the first connection terminal 3, the first coupling terminal 18, and the second coupling terminal 19, the supporting part 11a of the support member 11 is attached to the portion 19a. A top view (a view seen from the upper side a) representing a component 34 is illustrated in FIG. 9, and a rear view (a view seen from the one side c) is illustrated in FIG. 10. In the component 34, the support member 11 is attached to the second intermediate member 30. The upper and lower sides of FIG. 10 are inverted with respect to FIG. 8, and in FIG. 10, the rear side of the second intermediate member 30 is seen. In FIG. 9, the positions of the folding lines M to N and the folding lines P to S are respectively illustrated. At the folding lines M to N and the folding lines P to S, the second intermediate member 30 is folded by folding processing.

The second intermediate member 30 after folding processing includes, as described above, the portions 31b and 31a forming the first connection terminal 3, the portion 18a forming the first coupling terminal 18, and the portion 19a forming the second coupling terminal 19. The portion 18a forming the first coupling terminal 18 includes the portions 31a and 31b forming the first connection terminal 3, and the portions 32a and 32b forming the frame ground part 32.

By cutting at the separating lines 181 and 191 and removing the coupling part 27, then the first connection terminal 3, first coupling terminal 18 (including the frame ground part 32), and second coupling terminal 19 (including the frame ground part 32) are obtained. In the following description, regardless of presence or absence of the coupling part 27, the respective elements are called by the names of the corresponding completed components (the first coupling terminal 18, the second coupling terminal 19, the first connection terminal 3, and the frame ground part 32).

In the axial line x direction, the attachment part 193 is continued at the lower side b of the leg part 192, and two holes 193b for attaching the supporting part 11a are provided in the axial line x direction in the vicinity of a central part (intermediate part) between an end part 193a at the lower side b of the attachment part 193 and the leg part 192. The support member 11 is attached to the second coupling terminal 19 by a fixture 193c such as a screw so that an attached surface 11a' of the supporting part 11a of the support member 11 makes contact with a surface 193d opposing the one side c of the attachment part 193 (see FIGS. 9 and 10).

The attachment of the support member 11 to the second coupling terminal 19 is similar to the attachment of the support member 12 to the second terminal member 16.

Figure 9:
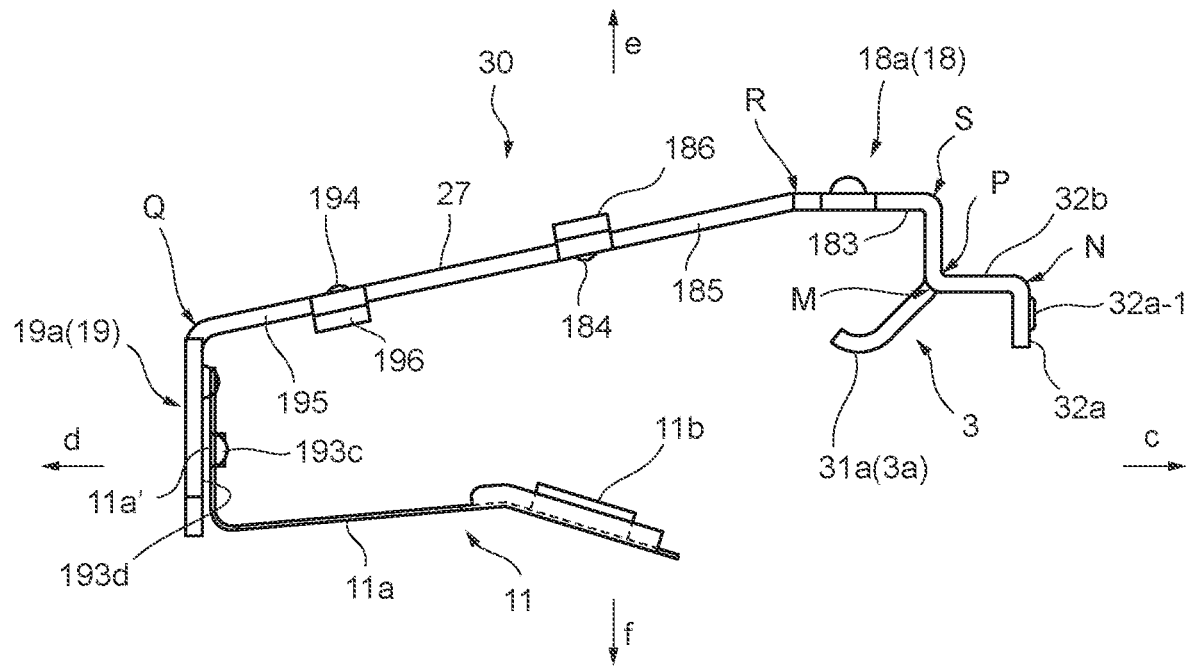
FIG. 9 is a top view (a view seen from the upper side a) illustrating a state where the supporting part of the support member is attached to the second intermediate member including the portion forming the first connection terminal, the first coupling terminal, and the second coupling terminal.
Figure 10:
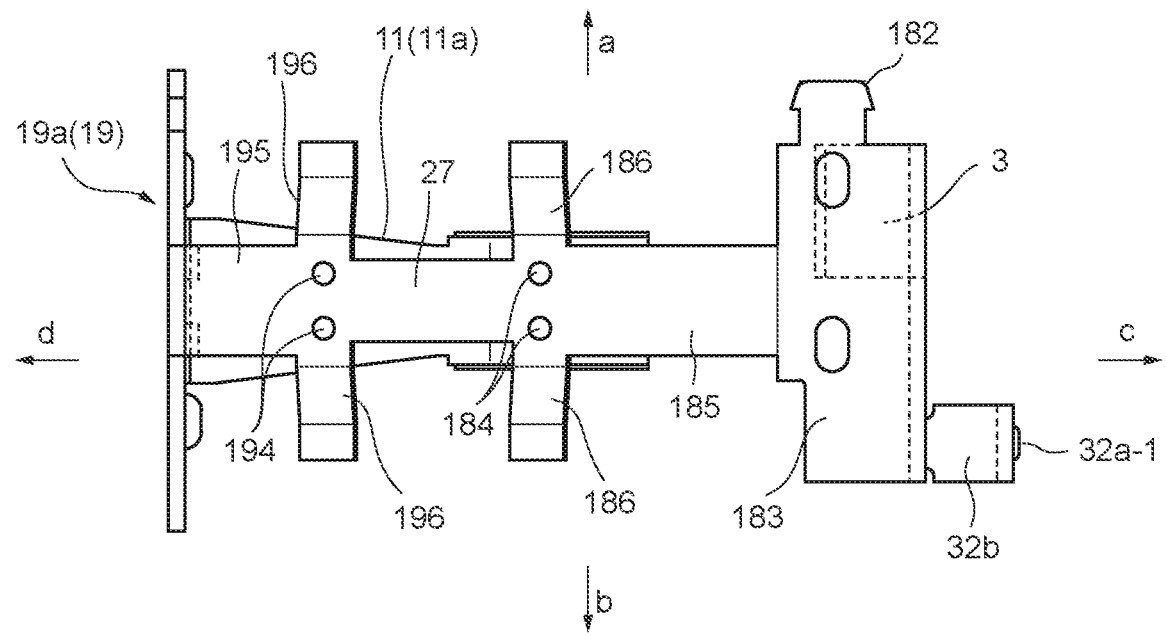
FIG. 10 is a rear view (a view seen from one side e) illustrating the state where the supporting part of the support member is attached to the second intermediate member including the portion forming the first connection terminal, the first coupling terminal, and the second coupling terminal.

As described above, the component 34 with the support member 11 attached to the second intermediate member 30 as illustrated in FIGS. 9 and 10 is obtained.

In the present embodiment, since the frame ground part 32 is not used, the portions 32a and 32b are cut at the position of the folding line M in the first coupling terminal 18 and removed from the first coupling terminal 18 at this stage. The above-mentioned cutting work may be carried out before the attachment work of the support member 11, carried out along with the folding processing at the folding lines P to S, or carried out before the folding processing.

The component 34 is attached to the bracket 5 in a state of the component 34 as it is, or in a state of two pieces of components of a component including the first coupling terminal 18 and the first connection terminal 3, and a component including the second coupling terminal 19 and the support member 11; the two pieces of components are achieved by the operation of cutting at the separating lines 181 and 191 and then removing the coupling part 27. When attached to the bracket 5 in the state of the component 34 as it is, after the attachment, cutting may be performed at the separating lines 181 and 191 to remove the coupling part 27.

As described above, the first coupling terminal 18 and the second coupling terminal 19 are engaged with (fixed to) the top surface 511 via the leg part 182 and the leg part 192, and are attached to the bracket 5.

The contact part 184 of the first coupling terminal 18 and the contact part 194 of the second coupling terminal 19 are in contact with each other and electrically connected to the PTC thermistor 7. As is understood from FIG. 9, in a state of the PTC thermistor 7 being not mounted, the first coupling terminal 18 and the second coupling terminal 19 are each located to depict a straight line.

When mounting the PTC thermistor 7, the conductive part 185 and the conductive part 195 are respectively retracted, and the PTC thermistor 7 is thrust into between the above conductive parts to be attached to a predetermined position of the bracket 5. At this time, the plate spring part 186 of the first coupling terminal 18 and the plate spring part 196 of the second coupling terminal 19 are each brought into contact with a wall provided in the bracket 5 and also brought into a state of being stretched to the wall, so as to function to press the conductive part 185 and conductive part 195 against the PTC thermistor 7 with the respective elastic forces.

The first connection terminal (first portion) 3 includes, as illustrated in FIGS. 2 and 9, the contact surface 3a extending from the main part 183 at the position of the folding line P toward the shaft 8, and having a predetermined curved surface at the tip part. The first connection terminal (first portion) 3 is located in a space 55 provided in the bracket 5, as illustrated in FIG. 2.

The first connection terminal 3 and the second connection terminal 4 in pair configure a connection terminal electrically connecting to the external device. The first connection terminal 3 and the second connection terminal 4 include the contact surfaces 3a and 4a in contact with the external terminal connecting to the external device.

As illustrated in FIGS. 3 and 4, at the bracket 5, the substrate 9 is attached to a position closer to the one side c of the bracket 5 with a fixture such as a screw. The substrate 9 opposes the top surface 511 of the bracket 5. As illustrated in FIGS. 2 and 3, the substrate 9 is disposed to cover part of the yoke 21 protruding toward the one side c from the coil 22 of the choke coil 2, the first connection terminal 3, and a region of the second connection terminal 4. Further, as illustrated in FIG. 3, in the arrow ef direction, the substrate 9 is located between the first coupling terminal 18 and the first terminal member 15.

As illustrated in FIG. 3, printed wiring is applied at a surface at the lower side b of the substrate 9, and pads 91 and 92 are formed at both ends in the arrow ef direction. As illustrated in FIG. 4, the protruding part 153 of the first terminal member 15 is located orthogonal to the substrate 9 at a position adjacent to the substrate 9. Then, the pad 92 formed at the surface at the lower side b of the substrate 9 and the protruding part 153 of the first terminal member 15 are bonded by soldering, so that an electric connection between the circuit of the substrate 9 and the first terminal member 15 is established, and the substrate 9 is fixed to the bracket 5. That is, the substrate 9 is fixed to the protruding part 153.

Although not illustrated in the drawings, a similar positional relationship is also established between the pad 91 formed at the surface of the lower side b of the substrate 9 and the main part 183 of the first coupling terminal 18; further, the bonding is made similarly by soldering, an electric connection is established between the circuit of the substrate 9 and the first coupling terminal 18, and the substrate 9 is fixed to the bracket 5.

As illustrated in FIG. 4, the protruding part 153 of the first terminal member 15 extends from the upper side a toward the lower side b of the substrate 9, and the end part 153a is in a state of appearing at the lower side b of the substrate 9. As illustrated in FIG. 3, the first draw wire 23a drawn from the portion at the one end side of the choke coil 2 is fitted into the gap of the engagement part 153b formed in the end part 153a (see FIG. 5). Then, the first draw wire 23a may be fixed and electrically connected to the first terminal member 15 by caulking the end part 153a by pliers or the like.

On the other hand, as illustrated in FIG. 3, the second draw wire 23b drawn from the portion at the other end side of the choke coil 2 is connected to the second terminal member 16. After the second draw wire 23b is fitted into the gap of the engagement part 164b, the second draw wire 23b and the second terminal member 16 may be fixed and electrically connected to each other by caulking the protruding part 164a by pliers or the like. That is, the second draw wire 23b is engaged with the engagement part 164b of the second terminal member 16.

As described above, components such as the first coupling terminal 18 including the first connection terminal 3, the first terminal member 15 including the second connection terminal 4 (first portion) and the frame ground part (second portion) 42, the choke coil 2, the PTC thermistor 7, the second coupling terminal 19, the second terminal member 16, the support members (brushes) 11 and 12, the substrate 9 and the like are attached to the bracket 5 (hereinafter, the components are collectively referred to as "components and the like").

The bracket 5 attached with the components and the like is attached to the frame 6 to cover the opening portion 61 of the frame 6. Specifically, as illustrated in FIG. 1, the bracket 5 is fixed while the tubular part 54 of the bracket 5 is fitted into the opening portion 61 of the frame 6. The inner peripheral surface 62 of the opening portion 61 and the tubular part 54 are fixed, for example, by a fixture such as an adhesive, a screw or the like.

Figure 11:
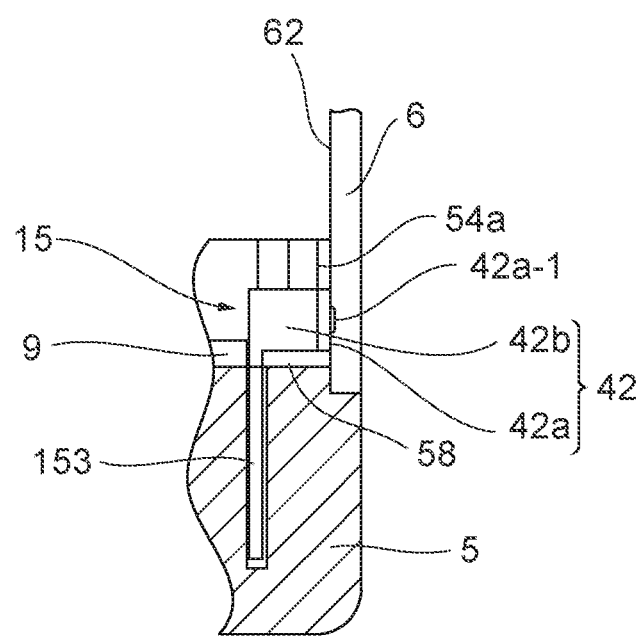
FIG. 11 is a partial cross-sectional view according to a T-T cross section in FIG. 2.

FIG. 11 is a partial cross-sectional view according to a T-T cross section in FIG. 2. The frame ground part 42 passes through a through-hole 59b provided in the tubular part 54 of the bracket 5, and projects from an outer peripheral surface 54a of the tubular part 54 of the bracket 5. The recess part 52b is provided at the outer peripheral surface 54a of the tubular part 54 of the bracket 5, and the portion 42a of the frame ground part 42 is accommodated in the recess part 52b. The portion 42a of the frame ground part 42 is disposed between the inner peripheral surface 62 of the frame 6 and the outer peripheral surface 54a of the tubular part 54 of the bracket 5.

Then, the projection part 42a-1 makes contact with the inner peripheral surface 62 to establish the frame ground. The portion 42a of the frame ground part 42 has a shape along the inner peripheral surface 62 of the frame 6, that is, a planar shape. It is desirable for the portion 42a to have a shape along a shape such as a curved surface when the inner peripheral surface of the frame in contact with the portion 42a has, for example, a curved shape or the like.

Since one end of the choke coil 2 is sandwiched between the substrate 9 and the holding part 53a of the bracket 5, the choke coil for removing electrical noise may be fixed with a simple configuration. As a result, because the use of an adhesive for fixing the choke coil is unnecessary or only a small amount of adhesive is required, the work process can be simplified, and the material cost brought by the usage amount reduction or non-use of the adhesive can be reduced, and thus the manufacturing cost may be lowered. The simplification of the work process also leads to improvement in productivity.

In general, when an external terminal connecting to an external device and connection terminals (the first connection terminal 3 and second connection terminal 4) are connected, an impact or vibration is applied causing the choke coil 2 to move, so that the connection with terminal members (the first terminal member 15 and second terminal member 16) may be disconnected. However, according to the present embodiment, the movement of the choke coil 2 can be suppressed and the connection between the terminal member and the choke coil 2 can be maintained, by pressing the end part of the choke coil 2 at the connection terminal side with the substrate 9.

The substrate 9 is typically provided for driving the motor 1, and according to the present embodiment, the choke coil 2 can effectively be fixed without adding any new component by using the substrate 9 for pressing the choke coil 2 as well.

The motor of the present invention is not limited to the configuration of the embodiment described above. For example, the motor 1 of the above-described embodiment is described by exemplifying such a configuration that one end of the choke coil 2 is sandwiched between the substrate 9 and the holding part 53a of the bracket 5, but the present invention is not limited to the above configuration, and the substrate 9 may be fixed to the bracket 5 via a gap with respect to the one end of the choke coil 2, for example. By locating the choke coil 2 between the substrate 9 and the opposing surface of the bracket 5, the detachment, movement, and the movement of the choke coil 2 can be suppressed, and the connection between the terminal member and the choke coil 2 can be maintained.

As illustrated in FIGS. 1 and 2, in the A-A cross section, the bracket 5 and the frame 6 are fitted to each other, and thus the frame 6 is present adjacent to the outer periphery of the bracket 5. However, in the axial line x direction, only the bracket 5 is present in a region closer to the upper side a (for example, a region J in FIG. 1), and the frame 6 is not present. In FIG. 2. regions depicted by dotted lines and denoted by reference signs 57 and 58 indicate openings (hereinafter, referred to as a "hole part 57" and a "hole part 58") provided at the side part 52 of the bracket 5 in the region J closer to the upper side a relative to the A-A cross section.

Figure 12:
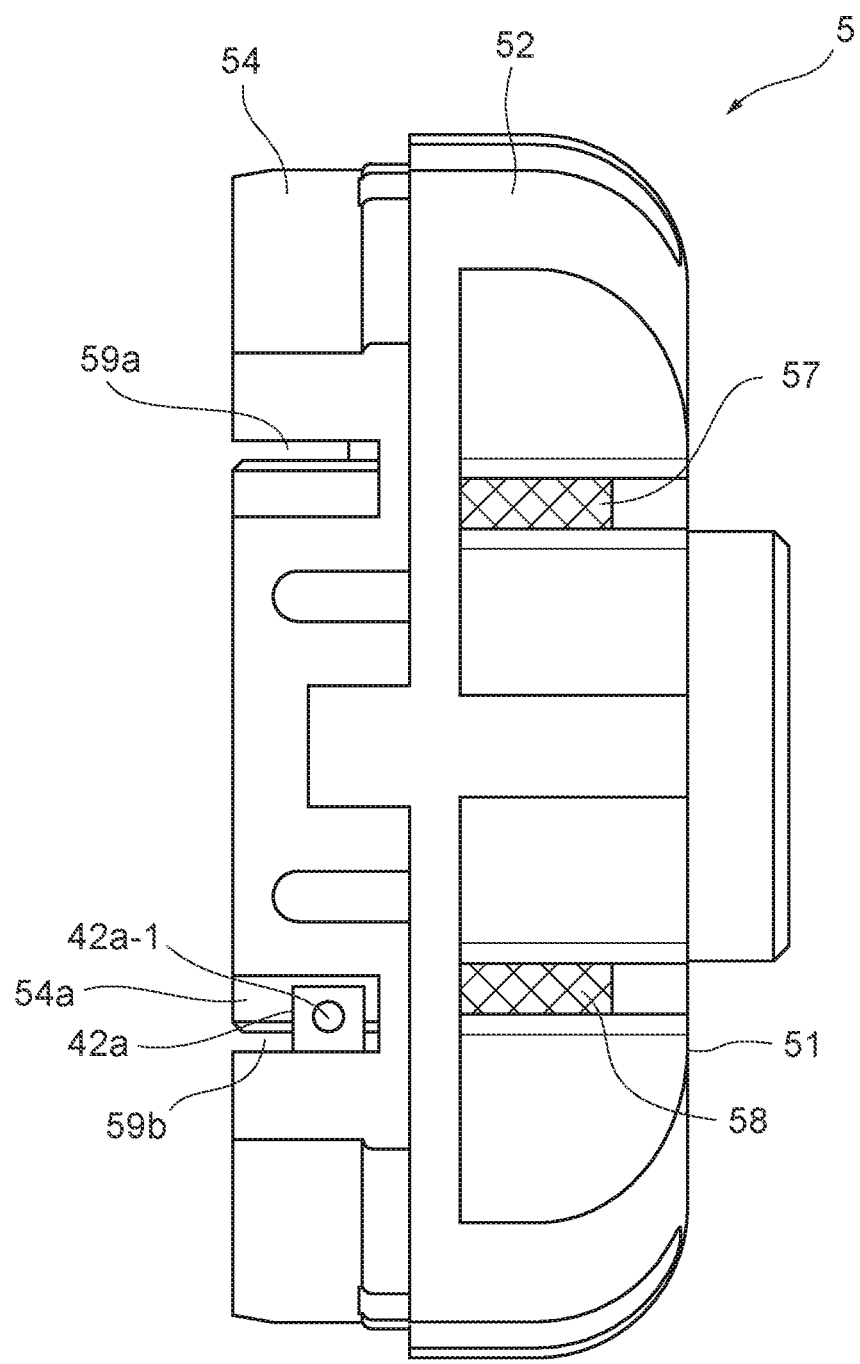

FIG. 12 is a side view seen from a separate position at the one side c of the bracket 5 attached with the components and the like. When viewed from the outside of the bracket 5 (in FIG. 2, when viewed from a separate position at the one side c), the hole part 57 is open toward the contact surface 3a of the first connection terminal 3, and the hole part 58 is open toward the contact surface 4a of the second connection terminal 4 (in FIG. 12, the interior of each of the hole parts 57 and 58 is omitted).

As a result, the external terminal (not illustrated) connecting to the external device is inserted into the bracket 5 from the hole parts 57 and 58, and is brought into contact with the contact surfaces 3a and 4a. That is, the first connection terminal 3 and the second connection terminal 4 are female terminals in the motor 1. The hole parts 57 and 58 of the bracket 5, the spaces 55 and 56 of the bracket 5, the first connection terminal 3, and the second connection terminal (first portion) 4 form a connector. Into the connector, the external terminal (not illustrated) connecting to the external device is inserted.

In the motor 1 of the present embodiment described above, one terminal member (the first terminal member 15) includes the first portion (the second connection terminal 4 serving as a female terminal) and the second portion (the frame ground part 42) in contact with the frame 6 made of the metal member. The first portion is connected to the external terminal connecting to the external device. Through the insertion and extraction of the external terminal connecting to the external device, an impact and vibration are applied to the second connection terminal 4, and consequently a strong load, a torsional load, and the like are applied to the second connection terminal 4.

However, according to the motor 1 of the present embodiment, because the frame ground part 42 is disposed and supported between the inner peripheral surface 62 of the frame 6 and the outer peripheral surface 54a of the tubular part 54 of the bracket 5, the deformation of the second connection terminal 4 may be suppressed. The frame ground part 42 is another portion of the same member (first terminal member 15) as the second connection terminal 4.

In particular, in the present embodiment, the first portion (second connection terminal 4) and the second portion (frame ground part 42) branch from another portion (protruding part 153) of the terminal (first terminal member 15). Therefore, the distance between the first portion and the second portion is short. This makes it possible to effectively suppress the effects of the load, twisting, and the like on the first portion by supporting the second portion with the bracket 5 or the frame 6.

As described above, the motor of the present invention is described with reference to the preferred embodiment, but the motor of the present invention is not limited to the configuration of the embodiment described above. For example, in the motor 1 of the above-described embodiment, such a configuration is exemplified that, of the terminals connected to the external terminal connecting to the external device, a portion at the second connection terminal 4 side is frame-grounded, but a configuration of causing a portion at the first connection terminal 3 side to be frame-grounded may be employed.

In this case, the contact surface 3a (portion 31a) of the first connection terminal 3 becomes the "first portion connected to the external terminal connecting to the external device" referred to in the present invention. Accordingly, in the description of a modification example given below, the first connection terminal 3 may be referred to as the first connection terminal (first portion) 3.

In the present modification example to achieve a motor configured to frame-ground the portion at the first connection terminal 3 side, the motor can be fabricated by using the same constituent components as the constituent components of the motor 1 of the above-described embodiment. Specifically, in the motor 1 of the embodiment, the portion 32b and the 32a capable of forming the frame ground part are not subjected to the work of cutting and removing from the first coupling terminal 18.

Further, in the motor 1 of the embodiment, since the portion 42b and portion 42a capable of forming the frame ground part 42 are not used, the portion 42a and portion 42b are cut at the position of the folding line K in the first terminal member 15 and then removed from the first terminal member 15 at any stage. The above-mentioned cutting work may be carried out before or after the attachment work of the support member 12, carried out along with the folding processing at the folding lines F to I, or carried out before the folding processing.

In the present modification example, a terminal including the first connection terminal 3 corresponding to the first portion and the frame ground part 32 corresponding to the second portion corresponds to the first coupling terminal 18.

The first coupling terminal 18 branches into the first connection terminal (first portion) 3 and the frame ground part (second portion) 32 at the main part 183 (another portion of the terminal).

The frame ground part (second portion) 32 extends at the position of the folding line M from the main part 183 toward the inner peripheral surface 62 of the frame (metal member) 6, as illustrated in FIG. 9. The positions of the folding line M and the folding line P are set in such a manner that only the folding directions are different, but the positions of the folding axes extending in the axial line x direction are substantially coincident with each other.

Further, the frame ground part (second portion) 32 is folded in the arrow f direction at the position of the folding line N, and continues to the portion 32a extending in a direction along the inner peripheral surface 62 of the frame 6, as illustrated in FIG. 9. As illustrated in FIG. 9, the frame ground part 32 includes a projection part 32a-1 having a circular emboss shape substantially at the center of a surface opposing the inner peripheral surface 62 of the frame 6 in the portion 32a.

As depicted with the dotted lines in FIG. 3, the frame ground part 32 passes through a through-hole 59a provided at the tubular part 54 of the bracket 5, and projects from the outer peripheral surface 54a of the tubular part 54 of the bracket 5. The portion 32a of the frame ground part 32 is disposed between the inner peripheral surface 62 of the frame 6 and the outer peripheral surface 54a of the tubular part 54 of the bracket 5.

Then, the projection part 32a-1 makes contact with the inner peripheral surface 62 to establish the frame ground. The portion 32a of the frame ground part 32 has a shape along the inner peripheral surface 62 of the frame 6, that is, a planar shape. It is desirable for the portion 32a to have a shape along a shape such as a curved surface when the inner peripheral surface of the frame in contact with the portion 32a has, for example, a curved shape or the like.

The motor of the modification example described above includes the first portion (the first connection terminal 3 serving as a female terminal) and the second portion (the frame ground part 32) in contact with the frame 6 made of the metal member. In the first portion, one terminal member (the first coupling terminal 18) is connected to the external terminal connecting to the external device. Through the insertion and extraction of the external terminal connecting to the external device, an impact and vibration are applied to the first connection terminal 3, and consequently a strong load, a torsional load, and the like are applied to the first connection terminal 3.

However, according to the motor of the present modification example, because the frame ground part 32 is disposed and supported between the inner peripheral surface 62 of the frame 6 and the outer peripheral surface 54a of the tubular part 54 of the bracket 5, the deformation of the first connection terminal 3 may be suppressed. The frame ground part 32 is another portion of the same member (first coupling terminal 18) as the first connection terminal 3.

In particular, in the configuration of the present modification example, the first portion (first connection terminal 3) and the second portion (frame ground part 32) branch from another portion (main part 183) of the terminal (first coupling terminal 18). Therefore, the distance between the first portion and the second portion is short. This makes it possible to effectively suppress the effects of the load, twisting, and the like on the first portion by supporting the second portion with the bracket 5 or the frame 6.

In the motor 1 of the above-described embodiment, such a configuration is exemplified and described that the recess part 52b is provided at the outer peripheral surface 54a of the tubular part 54 of the bracket 5, and the portion 42a of the frame ground part 42 is accommodated in the recess part 52b, but the present invention is not limited to this configuration. Such an aspect may be employed that the recess part 52b is not present on the outer peripheral surface 54a of the tubular part 54 of the bracket 5, a recess part is provided at the inner peripheral surface 62 of the frame (metal member) 6, and the portion 42a of the frame ground part 42 is accommodated in this recess part.

Alternatively, such an aspect may be employed that recess parts are provided at both the outer peripheral surface 54a of the tubular part 54 of the bracket 5 and the inner peripheral surface 62 of the frame (metal member) 6, and the portion 42*a* of the frame ground part 42 is accommodated in the two recess parts. Furthermore, such an aspect may be employed that a recess part is not provided at any of the outer peripheral surface 54*a* of the tubular part 54 of the bracket 5 and the inner peripheral surface 62 of the frame (metal member) 6, and the portion 42*a* of the frame ground part 42 is sandwiched between the outer peripheral surface 54*a* and the inner peripheral surface 62.

In the motor 1 of the above-described embodiment, a configuration including the choke coil 2 is exemplified and described, but the present invention is not limited to the above configuration, and the configuration of the present invention may also be applied to a motor equipped without the choke coil 2. When it is attempted to achieve a motor equipped without the choke coil 2 in a similar configuration to the configuration of the motor 1 of the above-described embodiment, without removing the coupling part 17 in the first intermediate member 20, the first intermediate member 20 in the shape as it is after the folding processing may be attached to the bracket 5.

Figure 13:
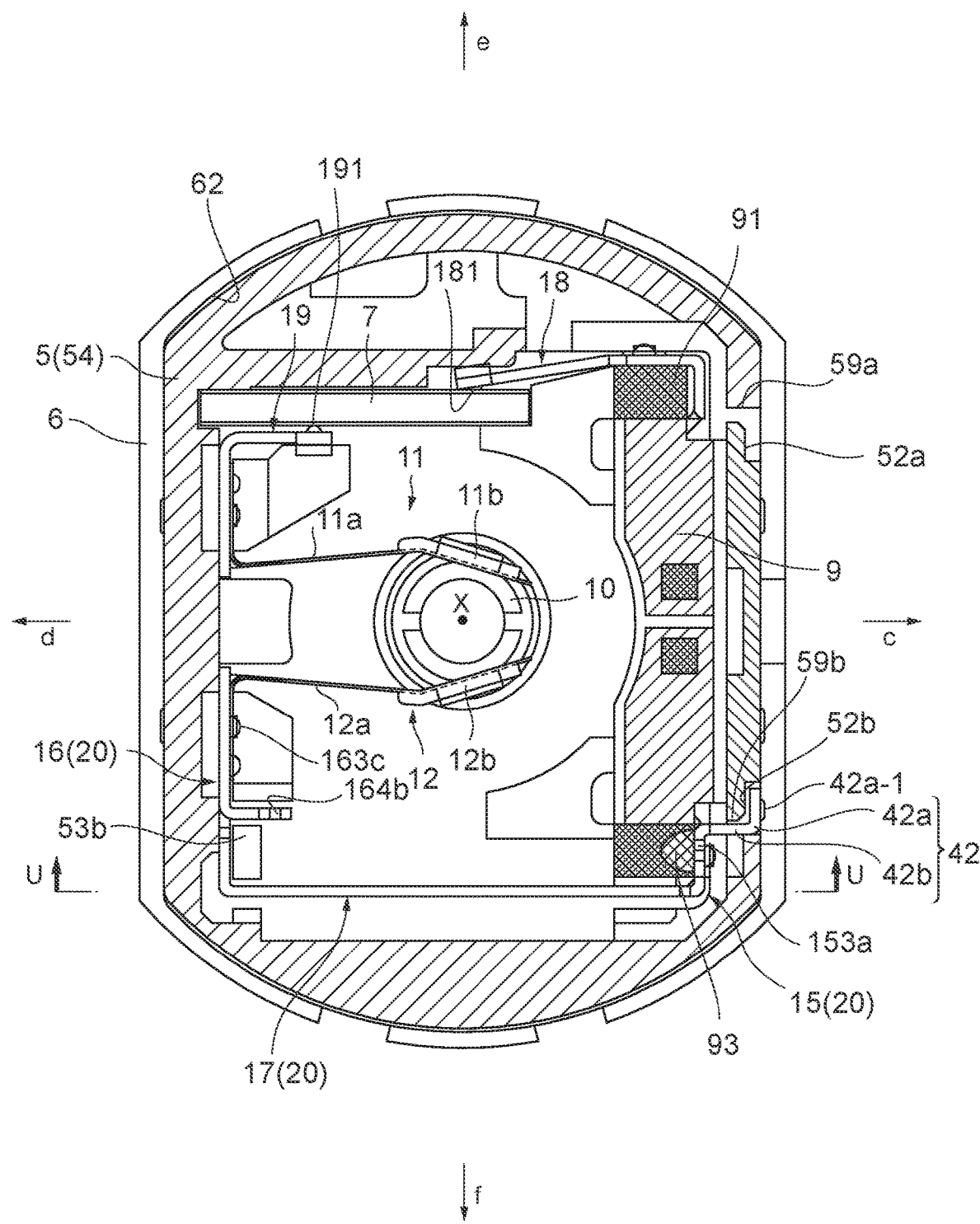
FIG. 13 is a transverse cross-sectional view at a position of a bracket of a motor of a modification example equipped without choke coil, and corresponds to a V-V cross-sectional view in FIG. 14.
Figure 14:
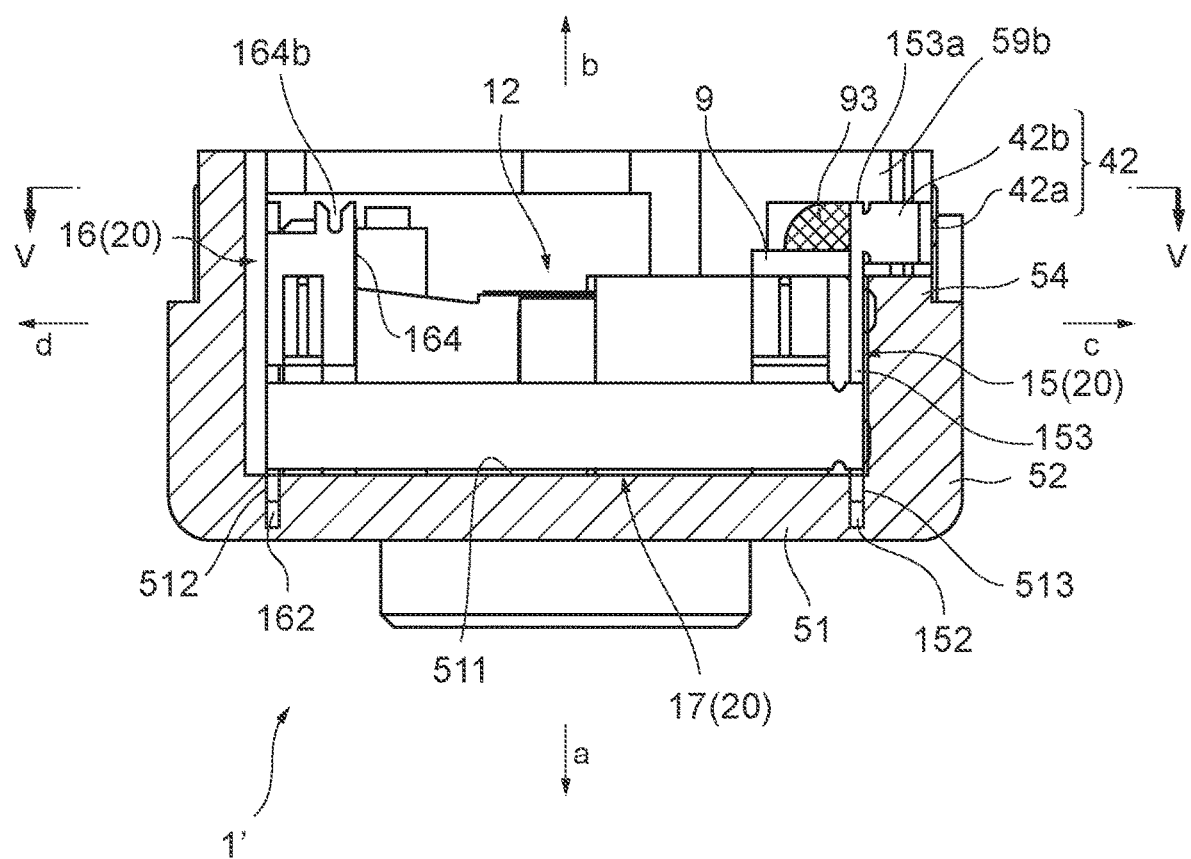
FIG. 14 is a U-U cross-sectional view in FIG. 13 illustrating the vicinity of a bracket of a motor of a modification example equipped without choke coil.

FIG. 13 illustrates a transverse cross-sectional view at a position of the bracket 5 of the motor 1' of the modification example equipped without the choke coil, and FIG. 14 illustrates a U-U cross-sectional view in FIG. 13 in the vicinity of the bracket of the motor 1' of the modification example. FIG. 13 corresponds to the cross-sectional view in FIG. 3 of the motor 1 of the embodiment, and illustrates a V-V cross-sectional view in FIG. 14. FIG. 14 corresponds to the cross-sectional view in FIG. 4 of the motor 1 of the embodiment. In FIGS. 13 and 14, the same reference signs as the reference signs in FIGS. 3 and 4 of the motor 1 of the above-described embodiment are used.

As illustrated in FIGS. 13 and 14, no choke coil is present in the portion having incorporated the choke coil 2 in the motor 1 of the embodiment, and the coupling part 17 of the first intermediate member 20 extends instead. That is, by the coupling part 17 extending in the portion having incorporated the choke coil, a portion between the first terminal member 15 and the second terminal member 16 is made to be in a directly-coupled state, so that an electric circuit is established to make it possible to function as the motor 1' of the modification example equipped without the choke coil.

In the motor 1 of the above-described embodiment, a configuration including the PTC thermistor 7 is exemplified and described, but the present invention is not limited to the above configuration, and the configuration of the present invention may also be applied to a motor equipped without the PTC thermistor 7.

When it is attempted to achieve a motor equipped without the PTC thermistor 7, it is sufficient to use the shape as it is of the first intermediate member 30 after the folding processing, without removing the coupling part 27 in the second intermediate member 30 as in the motor 1' of the modification example equipped without the choke coil. By doing so, by the coupling part 27 extending in the portion having incorporated the PTC thermistor 7, a portion between the first coupling terminal 18 and the second coupling terminal 19 is made to be in a directly-coupled state, so that an electric circuit is established to make it possible to function as a motor equipped without the PTC thermistor.

In addition, the motor according to the present invention may be appropriately modified by a person skilled in the art according to known knowledge in the past. Such modifications are of course included in the scope of the present invention as long as these modifications still include the configuration of the present invention.

The present application describes the following invention.

Conventionally, a motor including a connection terminal having a contact surface in contact with an external terminal connected to an external device and a bracket housing the connection terminal, and configured to drive by the external terminal being connected to the connection terminal has been known. Regarding such a motor, a technique including a choke coil for suppressing erroneous operations and the like is known by JP 2003-116247 A. The above-mentioned erroneous operations are caused by a phenomenon, and in this phenomenon, electric noise generated when the motor is driven propagates to other electric devices, electronic devices, or the like. The choke coil is fixed to a bracket, and when the choke coil is subjected to press fitting, for example, there is a risk that the core of the choke coil is cracked during the press fitting. Therefore, fixing the choke coil to the bracket is carried out by applying an adhesive to the choke coil.

With this, when adhesive strength decreases due to poor adhesion or aging, there is a concern that the choke coil rattles or is detached. In addition, when fabricating the motor, processes of applying the adhesive to the choke coil, bonding the choke coil to the bracket, and drying and curing by ultraviolet irradiation or the passage of time are needed, and thus an increase in manufacturing costs is caused based on an increase of the work processes, and an increase in material costs by the addition of adhesive. The increase of the work processes also leads to a decrease in productivity. An example of an object of the present invention is to provide a motor capable of fixing a choke coil for removing electric noise with a simple configuration. The above-mentioned problem is solved by one aspect of the present invention described below, for example. That is, one aspect of the motor of the present invention includes a connection terminal having a contact surface in contact with an external terminal connecting to an external device, a choke coil having one end at the connection terminal side and the other end at the opposite side to the connection terminal in an axial direction, a substrate having a wiring line electrically connecting the choke coil and the connection terminal, and a bracket provided with choke coil, the connection terminal, and the substrate, wherein the one end of the choke coil is located between the substrate and an opposing surface of the bracket.

In the motor, a first terminal member is provided, the first terminal member includes a protruding part connected to a first draw wire drawn from a portion at the one end side of the choke coil, and the substrate is fixed to the protruding part.

In the motor, there are provided a second terminal member including an engagement part and a second draw wire drawn from a portion at the other end side of the choke coil, wherein the second draw wire is engaged with the engagement part of the second terminal member, and the second terminal member and the choke coil are electrically connected to each other.

In the motor, a plurality of holding parts are provided at the surface opposing the substrate at the bracket, and the choke coil is held by the plurality of holding parts.

In the motor, the choke coil is sandwiched between the substrate and the plurality of holding parts.

In the motor, the bracket includes a side part intersecting with the surface opposing the substrate, the side part of the bracket is provided with an opening portion, and the opening portion is open toward the contact surface.

In the motor, the choke coil includes a coil and a yoke surrounded by the coil, a portion at one end side of the yoke protrudes from the coil, and part of the yoke protruding from the coil is located between the substrate and the opposing surface of the bracket.

REFERENCE SIGNS LIST

1 Motor, 2 Choke coil, 3 First connection terminal, 3a Contact surface, 4 Second connection terminal (First portion), 4a Contact surface, 5 Bracket, 6 Frame (Metal member), 7 PTC thermistor, 8 Shaft, 9 Substrate, 9a, 9b Through-hole, 10 Commutator, 11, 12 Support member (Brush), 11a, 12a Supporting part, 11b, 12b Contact part, 13 Bearing, 14 Rotor, 14a Coil, 14b Rotor core, 15 First terminal member, 15a Portion, 151 Separating line, 151b, 151c Recess, 152 Leg part, 153 Protruding part, 153a End part, 153b Engagement part, 16 Second terminal member, 16a Portion, 161 Separating line, 161b, 161c Recess, 162 Leg part, 163 Attachment part. 163a End part, 163b Hole, 163c Fixture, 163d Surface, 164 Projecting part, 164a Protruding part, 164b Engagement part, 17 Coupling part, 18 First coupling terminal, 18a Portion, 181 Separating line, 182 Leg part, 183 Main part, 183a End part, 184 Contact part, 185 Conductive part, 186 Plate spring part, 19 Second coupling terminal, 191 Separating line, 192 Leg part, 193 Attachment part, 193a End part, 193b Hole, 193c Fixture, 193d Surface, 194 Contact part, 195 Conductive part, 196 Plate spring part, 20 First intermediate member, 21 Yoke, 22 Coil, 23a First draw wire, 23b Second draw wire, 24 Component, 27 Coupling part, 30 Second intermediate member, 31a, 31b Portion, 32 Frame ground part (Second portion), 32a, 32b Portion, 32a-1 Projection part, 41a, 41b Portion, 42 Frame ground part (Second portion), 42a, 42b Portion, 42a-1 Projection part, 51 Lid, 511 Top surface, 512, 513 Insertion hole, 52 Side part, 52a, 52b Recess part, 53a, 53b Holding part. 54 Tubular part, 54a Outer peripheral surface, 55, 56 Space, 57, 58 Hole part, 59a, 59b Through-hole, 61 Opening portion, 62 Inner peripheral surface

The invention claimed is:

1. A motor comprising:

a metal member including a tubular shape having an opening portion and an inner peripheral surface forming the opening portion in an axial direction;

a bracket including a tubular part disposed inside the opening portion; and a terminal provided at the bracket, wherein the terminal includes a first portion connected to an external terminal connecting to an external device, and a second portion in contact with the metal member, and the second portion is disposed between the inner peripheral surface of the metal member and an outer peripheral surface of the tubular part of the bracket.

2. The motor according to claim 1, wherein the first portion and the second portion branch from another portion of the terminal.

3. The motor according to claim 1, wherein a recess part is present at the inner peripheral surface of the metal member, and the second portion is present at the recess part.

4. The motor according to claim 1, wherein the second portion includes a shape along the inner peripheral surface of the metal member.

5. The motor according to claim 1, wherein the second portion passes through the tubular part of the bracket and protrudes from the outer peripheral surface of the bracket.

6. The motor according to claim 1, further comprising:

a brush and a commutator provided at the bracket, wherein the terminal is electrically connected to the brush.

7. The motor according to claim 1, wherein a substrate is provided at the bracket, and the terminal is connected to a wiring line of the substrate.

8. The motor according to claim 1, wherein the bracket includes a side part disposed adjacent to the tubular part, the side part being disposed outside of the opening portion in the axial direction, the side part includes a hole part, in a radial direction, there is a space in an interior of the bracket continued to the hole part of the bracket, the first portion is disposed within the space, and a connector is formed with the hole part of the bracket, the space of the bracket, and the first portion.

* * * * *